(12) United States Patent
Drapa

(10) Patent No.: US 7,882,460 B2
(45) Date of Patent: Feb. 1, 2011

(54) METHOD OF CIRCUIT POWER TUNING THROUGH POST-PROCESS FLATTENING

(75) Inventor: Mark D. Drapa, Westford, VT (US)

(73) Assignee: International Business Machines Corporation, Armonk, NY (US)

( * ) Notice: Subject to any disclaimer, the term of this patent is extended or adjusted under 35 U.S.C. 154(b) by 315 days.

(21) Appl. No.: 12/111,574

(22) Filed: Apr. 29, 2008

(65) Prior Publication Data

US 2009/0271746 A1 Oct. 29, 2009

(51) Int. Cl.
G06F 17/50 (2006.01)
(52) U.S. Cl. .................... 716/2; 716/4; 703/13
(58) Field of Classification Search .............. 716/2, 716/4; 703/13
See application file for complete search history.

(56) References Cited

U.S. PATENT DOCUMENTS

| | | | | |
|---|---|---|---|---|
| 6,035,106 | A * | 3/2000 | Carruthers et al. ............ | 703/1 |
| 6,044,448 | A * | 3/2000 | Agrawal et al. ............... | 712/9 |
| 6,587,992 | B2 | 7/2003 | Marple | |
| 6,637,009 | B2 | 10/2003 | Narita | |
| 6,823,497 | B2 * | 11/2004 | Schubert et al. .............. | 716/4 |
| 6,968,517 | B2 | 11/2005 | McConaghy | |
| 6,986,109 | B2 | 1/2006 | Allen et al. | |
| 7,266,549 | B2 | 9/2007 | de Souza et al. | |
| 7,269,815 | B2 * | 9/2007 | Wein et al. .................... | 716/18 |
| 7,272,805 | B2 * | 9/2007 | McGaughy et al. ........... | 716/3 |
| 7,536,288 | B2 * | 5/2009 | Nelson et al. ................. | 703/13 |
| 2003/0079190 | A1 * | 4/2003 | Parashkevov et al. ......... | 716/4 |
| 2005/0183054 | A1 * | 8/2005 | Wein et al. .................... | 716/11 |
| 2005/0268268 | A1 * | 12/2005 | Wang et al. ................... | 716/9 |
| 2007/0245281 | A1 * | 10/2007 | Riepe et al. ................... | 716/9 |

OTHER PUBLICATIONS

Ganesh et. al.; "Synthesis of Power-Optimized and Area-Optimized Circuits from Hierarchical Behavioral Descriptions"; DAC 98, San Francisco, California; 1998; pp. 439-444.*
Koch, "Module Compaction in FPGA-based Regular Datapaths", 33rd Design Automation Conference, Jun. 1996, pp. 471-476.
Nijssen, et al, "GreyHound: A Methodology for Utilizing Datapath Regularity in Standard Design Flows", Integration, the VLSI journal 25 (1998) pp. 111-135.

* cited by examiner

*Primary Examiner*—Naum B Levin
(74) *Attorney, Agent, or Firm*—Wood, Herron & Evans, LLP

(57) ABSTRACT

A method is provided for optimizing a hierarchical circuit design containing at least one reused cell. A first optimization is performed on the circuit design to meet a first objective. The first optimization is subject to a first constraint that all instances of the at least one reused cell are kept identical. The at least one reused cell is uniquified. A second optimization is performed to meet a second objective allowing uniquified instances of the at least one reused cell to be independently modified. The second optimization is subject to a second constraint that the first objective remains met.

6 Claims, 4 Drawing Sheets

METHOD OF CIRCUIT POWER TUNING THROUGH POST-PROCESS FLATTENING

FIELD OF THE INVENTION

The present invention relates to integrated circuit design and, more particularly, to optimization of integrated circuit designs.

BACKGROUND OF THE INVENTION

The increasing speed and complexity of today's designs implies a significant increase in the power consumption of very-large-scale integration chips. To meet the power consumption challenge, researchers have developed many different design techniques to reduce power. However, with the complexity of contemporary integrated circuits, having over 100 million transistors, clocked over 1 GHz, manually performing power optimization on chip designs would be hopelessly slow and all too likely to contain errors. Thus computer-aided design tools (CAD) and associated methodologies have become a necessity for designing integrated circuits.

Many different techniques may be used to reduce power consumption at the circuit level. Some of the techniques include transistor sizing, voltage scaling, voltage islands, variable $V_{DD}$, multiple threshold voltages, power gating, among others. Transistor sizing includes techniques of adjusting the size of each gate or transistor for minimum power. Voltage scaling techniques include lower supply voltages, which use less power, but at the expense of speed. Voltage islands include different blocks that can be run at different voltages, saving power. This design practice, however, may require the use of level-shifters when two blocks with different supply voltages communicate with each other. With variable $V_{DD}$, the voltage for a single block can be varied during operation—high voltage (and high power) when the block needs to go fast, and low voltage when slow operation is acceptable. Techniques using multiple threshold voltages, in the simplest form, have transistors with two different thresholds available, commonly referred to as High-$V_t$ and Low-$V_t$, where $V_t$ is the threshold voltage. Generally, high threshold transistors are slower but leak less, and can be used in non-critical circuits. Power gating techniques use high $V_t$ sleep transistors which cut-off a circuit block when the block is not switching, though the sleep transistor sizing may be an important design parameter.

Ideally, these power reduction techniques may be utilized by chip designers on a cell-by-cell basis for an optimum design. However, for circuits with millions of transistors, the structure, timing goal, and design schedule of the circuit greatly limits the designers ability to use the above techniques to achieve potential power savings. Hierarchical schematics/layout can drastically shorten the design cycle of a macro, but offers the fewest opportunities to power detuning algorithms. Timing goals often times converge late (or even post-layout) in a design cycle. Detuning to those goals without introducing schedule risk and layout rework presents a nearly impossible task to the circuit designers.

The above problems are common to most custom or semi-custom designs and rarely have a definitive solution. It is possible to maximize potential power savings in a macro by increasing the granularity of the hierarchy or building it flat. This, however, comes at a cost of increased complexity, schematic/layout entry time, and CAD tool run time. Timing goals for a design are usually met by over designing critical paths to include some amount of padding, intended to insure against late design rework. This, however, introduces extra gate area and wasted power.

Contemporary solutions do not offer a complete solution to the over design problem, though, as they are highly manual and require a specific design structure to be followed. Additionally, contemporary solutions do not address existing or already complete designs. A significant problem facing most circuit designers using the contemporary tools is how to design efficiently, yet still maximize the ability to reclaim wasted power as a post-processing step outside the regular design cycle.

SUMMARY OF THE INVENTION

Embodiments of the current invention are directed to creating a design methodology that can take any layout complete macro and have it be nondestructively detuned for power savings as a post-processing step. To achieve the objective, a method is provided for optimizing a hierarchical circuit design containing at least one reused cell. A first optimization is performed on the circuit design to meet a first objective. The first optimization is subject to a first constraint that all instances of the at least one reused cell are kept identical. The at least one reused cell is uniquified. A second optimization is performed to meet a second objective allowing uniquified instances of the at least one reused cell to be independently modified. The second optimization is subject to a second constraint that the first objective remains met.

The method may further provide for back annotating modifications from the second optimization to the circuit design. Formal timing testing is then performed on the back-annotated circuit design. The circuit design may then be updated with the back-annotated circuit design, in response to improved results from the first and second optimizations and the formal timing testing.

The circuit design may be a hierarchical circuit design or may be a combination of a hierarchical and a flat design, and in some embodiments, uniquifying the reused cell includes flattening the hierarchical circuit design, or portions thereof, and performing a timing analysis to create unique timing point reports to individualize the reused cell allowing instances of the reused cell to be modified during optimization.

Advantages of this approach over contemporary methods may include allowing circuit designers to design and to implement circuits in ways that are most efficient for them, rather than for the tools. Highly hierarchical data paths may then be power detuned just as effectively as a flat design.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the principles of the invention.

DETAILED DESCRIPTION

When circuit designers are presented with a new circuit design, they must balance their schedule with the complexity of the circuit. Because contemporary integrated circuits may contain millions of transistors, hierarchical design almost becomes a necessity for circuit designers. With so many transistors, circuit designers do not have the time to create flat designs where the designer individually designs each cell, transistor or gate. In hierarchical design, a chip designer designs a single instance, or slice, of a circuit containing the necessary cells and then replicates that instance as necessary for a particular component of the design. For example, if part of the chip design is for an OR function for two 64-bit numbers, the chip designer, would likely design an OR function for bit-0 and then replicate the circuit for that bit 63 more times forming the multi-bit data path. This methodology, however, can lead to an over design of a particular integrated circuit. This is due in part to chip designers designing the initial instance for worst-case scenarios or to meet special requirements of particular bits, such as for timing.

Embodiments of invention may assist circuit designers in creating a design methodology, which can take any layout complete macro, for example in a layout versus schematic (LVS) form, and have it be nondestructively detuned, or optimized to a given constraint, i.e. for power savings, as a post-processing step. The structure of the macro may be hierarchical or a combination of hierarchical and flat.

Figure 1:
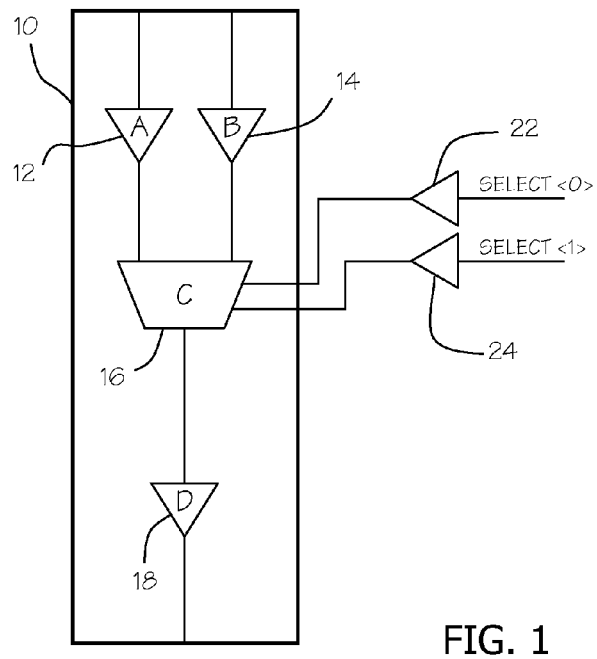
FIG. 1 is an exemplary cell of a circuit design.
Figure 2:
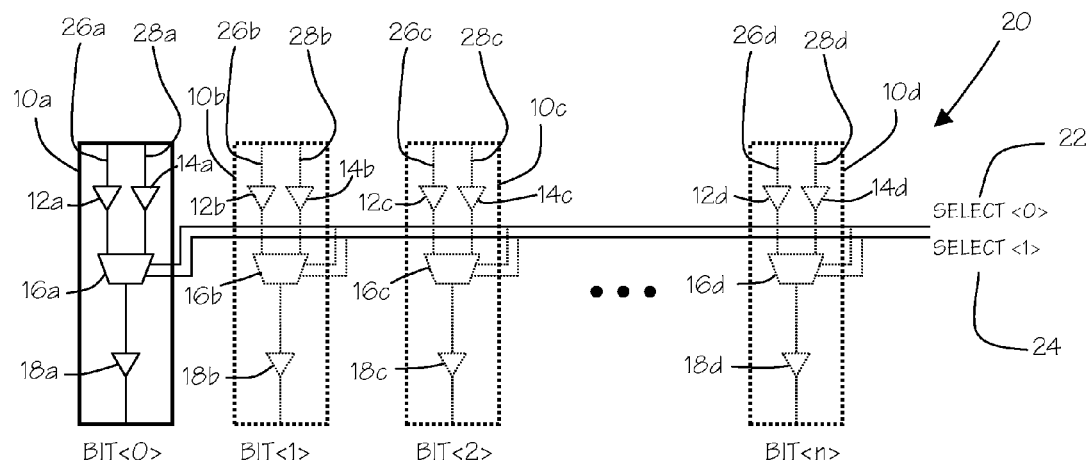
FIG. 2 is a portion of an exemplary hierarchical circuit design using the cell of FIG. 1.

FIGS. 1 and 2 illustrate a common approach to a hierarchical data path design. The circuit designer received a specification with a set of timing assertions by which the design must be timed. The specification may require a multi-bit circuit to perform some functionality. The circuit designer would then design a single instance 10 of the n-bit circuit, in this example containing cells cell 12 (Cell A), cell 14 (Cell B), cell 16 (Cell C), and cell 18 (Cell D). As discussed above, the designer may then design the instance 10 of the circuit to meet the criteria for a worst-case situation or to meet the requirements of one of the n-bits, in the case that the bit is critical to the circuit.

Once designed, the circuit designer may now replicate this instance 10 n–1 times to form a wide data path circuit 20. Because of the replication, each of the replicated instances 10a-10d has the same sizing for cell 12a-12d, cell 14a-14d, cell 16a-16d, and cell 18a-18d. However, the signal 22 (SELECT<0>) and signal 24 (SELECT<1>) travel the entire width of the data path. Bit 10d (Bit<n>), which is closer to the driving gates, receives signal 22 and signal 24 at times much earlier than bit 10a (Bit<0>).

The gate sizes for cells 12a-12d, cells 14a-14d, cells 16a-16d, and cells 18a-18d are generally determined by the farthest receiver, for example, bit 10a. Each of the other bits, 10b-10d, could then be downsized to save power if the design structure were flat. But, because the design of the circuit 20 is hierarchical, a potential power savings cannot be implemented without a significant impact to each instance affecting the overall circuit. Similarly, the arrival time of the data path signals 26a-d and 28a-d feeding cells 12a-12d and cells 14a-14b, respectively, for each bit can be drastically different. These arrival times also cannot be capitalized on without again making changes to the entire hierarchy affecting timing and power savings in other locations of the circuit 20.

Figure 3:
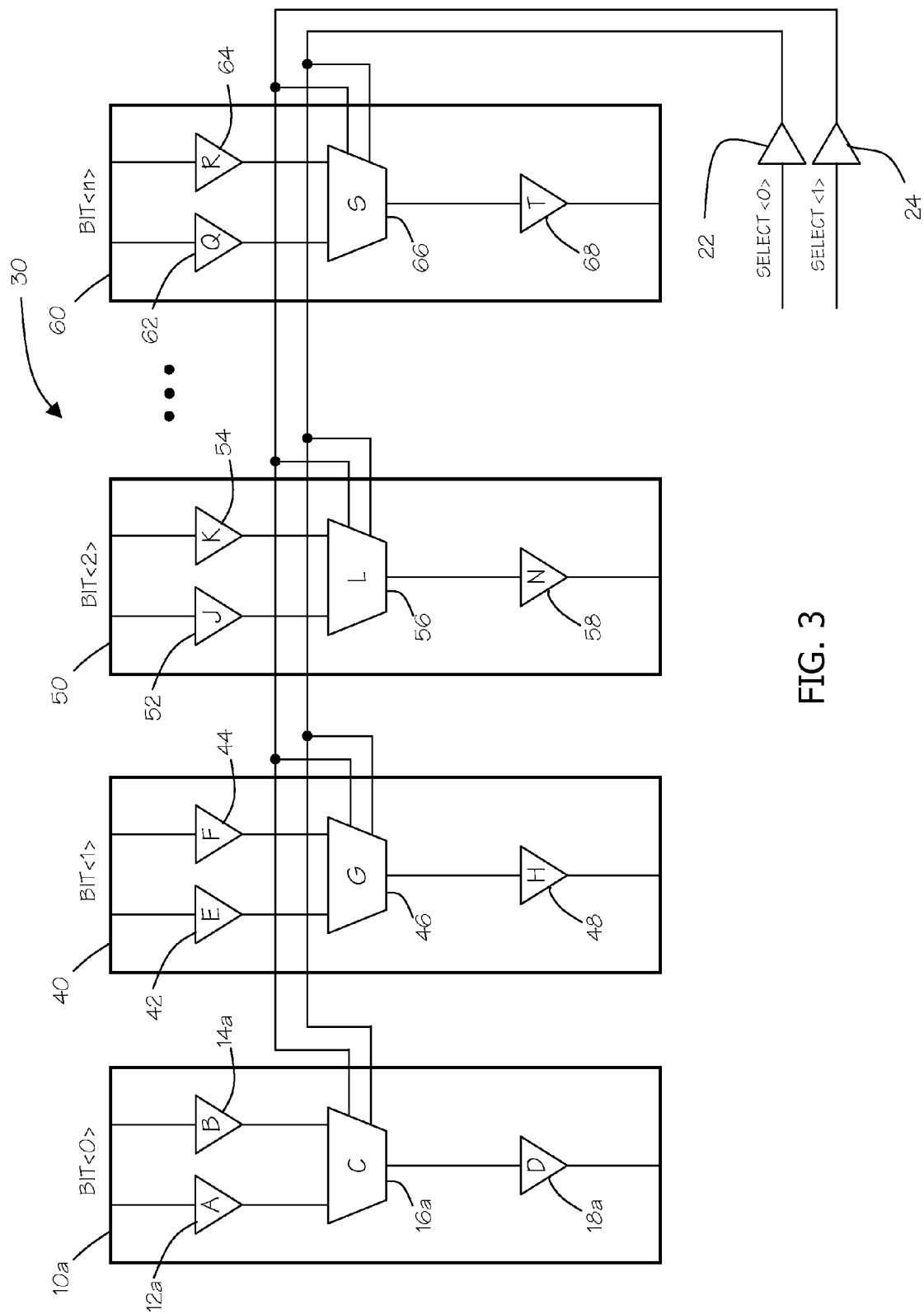
FIG. 3 is a flattened representation of the hierarchical circuit design of FIG. 2.

An initial optimization is performed on the hierarchical circuit, to meet a design objective, timing, for example. The first optimization may also be constrained by keeping each of the replicated instances or slices of the design identical. In other words, any change made to one of the instances is propagated to all other replicated instanced. Once the design objective has been achieved on the hierarchical circuit, the instances of each of the may be individually optimized to meet a second design objective, power, for example. In order to individually optimize the cells within each of the instances of the circuit 20, the hierarchical design is uniquified. A first step in uniquifying the circuit 20 is to flatten the design and remove any artificial constraints, i.e. the constraint to keep instances identical, to detuning that are due to the hierarchy. After the circuit 20 has been flattened, a timing analysis is run to create unique timing point reports on each path through the circuit 20, which produces a uniquified circuit 30 as shown in FIG. 3. The timing data generated from the flattened design must still conform to the requirements of the circuit specification from the hierarchical design. As can be seen in FIG. 3 each of the instances 10a, 40, 50, 60 now contains unique cells 12a-18a, cells 42-48, cells 52-58, and cells 62-68 respectively. Contemporary simulation tools may now be used to evaluate each individual timing path and make power saving substitutions until the end result approaches a design constraint specified by a specific timing limit. Allowable power saving substitutions may include changing the threshold voltage ($V_t$) of the gates, changing from a "regular" $V_t$ to a "high" $V_t$, for example, removing fingers from a device, decreasing a device size, among others.

Figure 4:
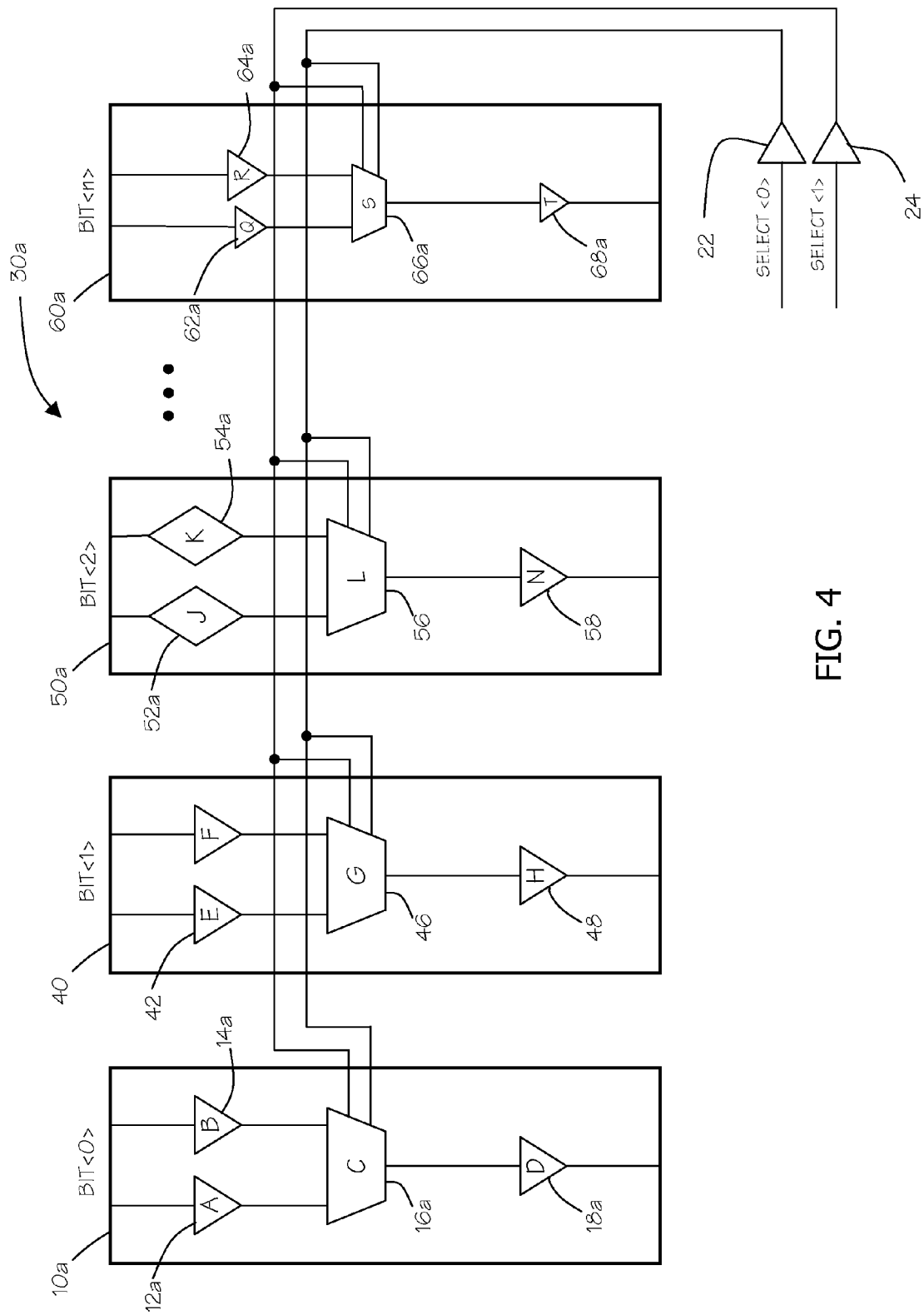
FIG. 4 is an optimized version of the flattened circuit design of FIG. 3.

After the simulation tools have optimized the circuit design, resulting in a circuit 30a as illustrated in FIG. 4, a new netlist may then be back annotating to reflect the optimized design. For example, bit 60a (Bit<n>) may be significantly smaller, having smaller cells 62a-68a, and use less power than a bit 10a (Bit<0>). Bit 50a (Bit<2>) may change some of its cells, 52a, 52b, having different transistor requirements and configurations. Other bits may adjust other parameters as well such as gate sizes and threshold voltages. The resulting solution is then back annotated to the flattened circuit 30 schematic. The new design created from the back annotation may now be formally timed with the new design and timing analysis presented to the circuit designer. The circuit designer may then compare the results, i.e. timing, slack, total area, $V_t$ percentage, etc., of the original designed circuit 20 to the optimized circuit design 30a. If the result is acceptable or more advantageous, the circuit designer may choose to incorporate the optimized circuit 30a by setting it as the default design. If not, the designer may adjust the constraints and iterate further on the design. This same methodology may be employed on existing designs utilizing late timing changes to further reduce power on already completed layouts.

Figure 5:
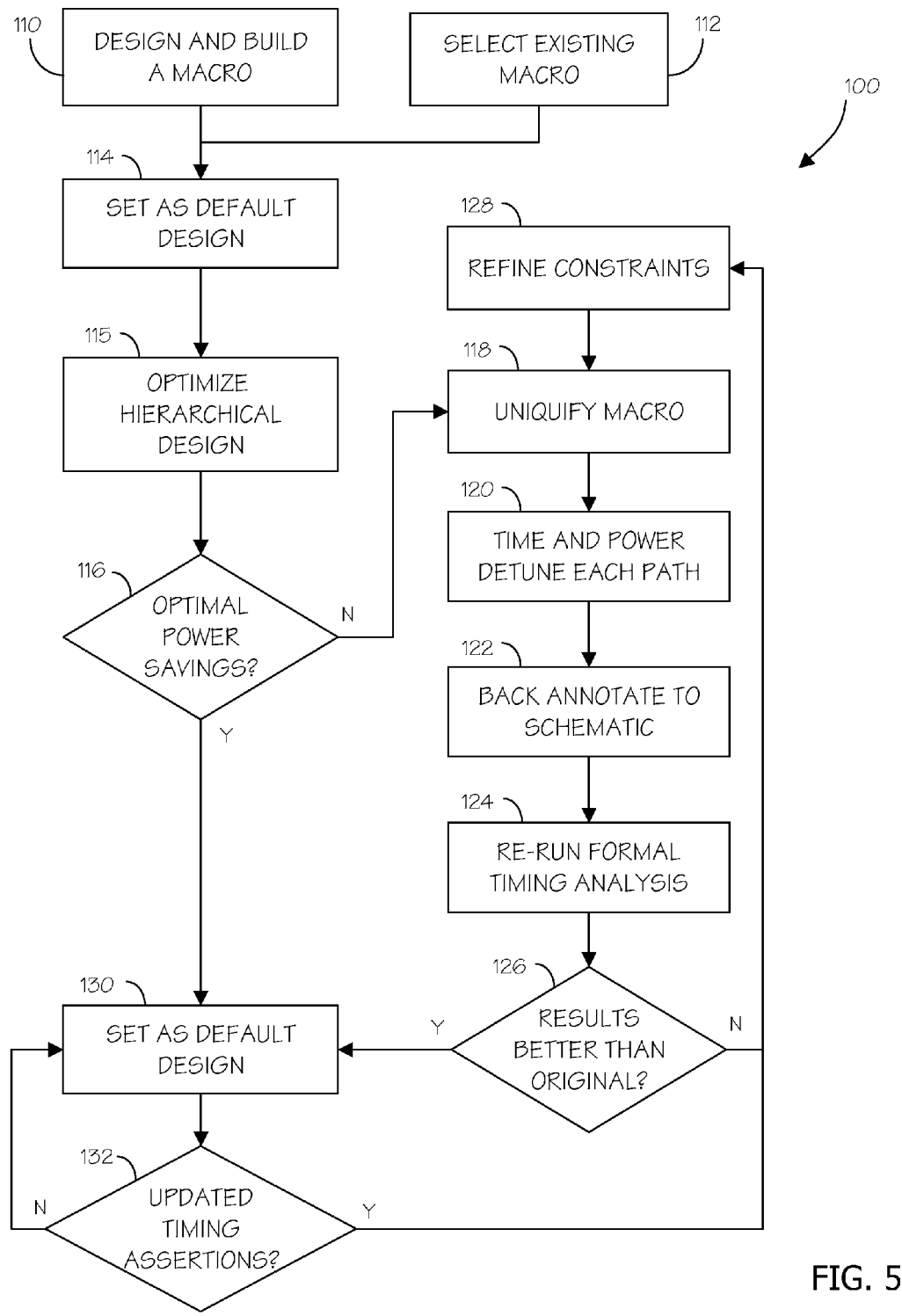
FIG. 5 is a flowchart illustrating a circuit optimization process consistent with embodiments of the invention.

An exemplary process, as discussed above, may be better seen in the flowchart 100 in FIG. 5. The process initiated by a circuit designer either designing and building a macro in block 110, or, as an alternative, selecting an existing macro in need of further tuning in block 112. In each of these two design paths, an initial optimization for timing analysis would have likely been performed. This macro is set as a default design in block 114. An initial constrained optimization is performed on the default design to meet a design objective and preserve the hierarchical nature of portions of the default design in block 115. The circuit designer then evaluates the default design to determine if the design is optimized for power savings. If not ("No" branch of decision block 116), then the default design is uniquified in block 118.

As discussed above, the uniquification process involves flattening any of the hierarchical designs that may exist in the macro and then performing timing analyses to create timing point data for each of the cells within the flattened macro. Once the macro has been uniquified, additional conventional analysis tools may be employed to further optimize timing and power savings, for example, but maintain the requirements of the original specification on each of the now unique cells and associated paths in block 120. Once the second optimization has been completed, the optimized design is back annotated to the schematic in block 122. To ensure that the requirements/constraints from the original specification have not been violated, formal timing analysis is performed on the back annotated circuit in block 124.

Once it has been verified that the new, optimized circuit is still within the requirements of the specification, the circuit designer may now compare it to the original design that was set as the default in block 114. As set forth above, the circuit designer may look at results such as timing, slack, total area, $V_t$ percentage, etc., to make a determination if the new, optimized design is better than the original design. If the results are not an improvement over the design set as the default in block 114 ("No" branch of decision block 126), then the circuit designer may refine the constraints of the optimization and repeat the steps in block 118-124. If the circuit designer determines that the optimized circuit is better than the design set as the default in block 114 ("Yes" branch of decision block 126), then the new design is set as the default design in block 130. If the original design had already attained optimal power settings ("Yes" branch of decision block 116), then the design is left as the default in block 130.

The process above can be further applied to changes in timing or other circuit parameters that are received after the circuit has been designed. For example, if timing changes are received after the design in complete corresponding to the "Yes" branch of decision block 132 in FIG. 5, the timing, power, or other constraints may be refined in block 128 and the steps 118-124 can again be performed with the new timing criteria.

The design process described above may provide circuit designers with a number of advantages over contemporary design methods. Among the advantages, the process allows designers to implement circuits in ways that are most efficient for them, rather than the design tools. Highly hierarchical data paths can be power detuned just as effectively as a flat design; structure of the design is not an obstacle. Designs may be power detuned multiple times, allowing the circuit designer to evaluate the redesigned circuit and choose whether or not to accept it. In the given example, detuned designs are created separate from the original design, thus making the post-processing process of uniquifying and optimizing invisible to the designer. Moreover, any of the analysis tools required for timing analysis, power analysis, optimization, etc. may utilize conventionally available tools.

While the present invention has been illustrated by a description of one or more embodiments thereof and while these embodiments have been described in considerable detail, they are intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A computer-implemented method of optimizing using a computer-aided design (CAD) tool to optimize a hierarchical circuit design containing at least one reused cell, the method comprising:
   performing a first optimization on the hierarchical circuit design with the CAD tool to meet a first objective subject to a first constraint that all instances of the at least one reused cell are kept identical, wherein the first objective is meeting a timing constraint and the first optimization is performed on a representative slice of the multi-bit data path;
   uniquifying the at least one reused cell with the CAD tool to create at least one uniquified instance of the at least one reused cell; and
   performing a second optimization with the CAD tool to meet a second objective allowing the at least one uniquified instance of the at least one reused cell to be independently modified and subject to a second constraint that the first objective remains met.

2. The method of claim 1, wherein the second objective is minimizing power consumption.

3. The method of claim 1, wherein the at least one reused cell is used in a plurality of slices of a multi-bit data path.

4. The method of claim 1 wherein uniquifying the at least one reused cell comprises:
   flattening the hierarchical circuit design; and
   performing a timing analysis to create unique timing point reports to individualize the at least one reused cell to allow the at least one reused cell to be modified during optimization.

5. The method of claim 1 further comprising:
   back annotating modifications from the second optimization to the circuit design;
   performing formal timing testing on the back annotated circuit design; and
   updating the circuit design with the back annotated circuit design, in response to improved results from the first and second optimizations and the formal timing testing.

6. A computer-implemented method using a computer-aided design (CAD) tool to optimize a hierarchical circuit design containing at least one reused cell, the method comprising:
   performing a first optimization on the hierarchical circuit design with the CAD tool to meet a first objective subject to a first constraint that all instances of the at least one reused cell are kept identical, wherein the first objective is meeting a timing constraint and the first optimization is performed on a representative slice of the multi-bit data path;
   uniquifying the at least one reused cell with the CAD tool to create at least one uniquified instance of the at least one reused cell, wherein uniquifying the at least one reused cell includes:
      flattening the hierarchical circuit design; and
      performing a timing analysis to create unique timing point reports to individualize the at least one reused cell to allow the at least one reused cell to be modified during optimization;
   performing a second optimization with the CAD tool to meet a second objective allowing the at least one uniquified instance of the at least one reused cell to be independently modified and subject to a second constraint that the first objective remains met;
   back annotating modifications from the second optimization to the circuit design;
   performing formal timing testing on the back annotated circuit design; and
   updating the circuit design with the back annotated circuit design, in response to improved results from the first and second optimizations and the formal timing testing.

* * * * *